United States Patent [19]

Loyek

[11] Patent Number: 4,715,560
[45] Date of Patent: Dec. 29, 1987

[54] COMPOSITE CRUCIFORM STRUCTURE FOR JOINING INTERSECTING STRUCTURAL MEMBERS OF AN AIRFRAME AND THE LIKE

[75] Inventor: Ernie F. Loyek, Sparks, Nev.

[73] Assignee: Lear Fan Limited, Reno, Nev.

[21] Appl. No.: 681,712

[22] Filed: Dec. 13, 1984

Related U.S. Application Data

[63] Continuation of Ser. No. 475,140, Mar. 14, 1983, abandoned, which is a continuation-in-part of Ser. No. 142,118, Apr. 21, 1981, abandoned.

[51] Int. Cl.$^4$ .............................................. B64C 1/06
[52] U.S. Cl. .................................. 244/177 R; 244/119; 244/131; 244/123; 52/664; 428/113; 428/116
[58] Field of Search ............... 244/117, 119, 123, 131, 244/133; 428/113, 116, 111, 257, 225, 265, 902; 403/174, 178; 52/664; 139/384 R

[56] References Cited

U.S. PATENT DOCUMENTS

| | | | |
|---|---|---|---|
| 3,009,232 | 11/1962 | Martin | 428/116 |
| 3,155,348 | 11/1964 | Ricard | 244/119 |
| 3,330,354 | 1/1967 | Duff | 428/116 |
| 3,645,833 | 2/1972 | Figge | 244/123 |
| 3,887,739 | 6/1975 | Kromrey | 428/116 |
| 3,914,494 | 10/1975 | Park | 428/116 |
| 3,983,281 | 9/1976 | Wakeman | 139/384 R |
| 4,113,910 | 9/1978 | Loyd | 244/131 |
| 4,137,335 | 1/1979 | Mayes et al. | 428/116 |
| 4,190,996 | 3/1980 | Schindler | 428/113 |
| 4,230,293 | 10/1980 | Hamm et al. | 244/119 |

FOREIGN PATENT DOCUMENTS

| | | | |
|---|---|---|---|
| 981985 | 6/1951 | France | 244/119 |
| 2013130 | 8/1979 | United Kingdom . | |

Primary Examiner—Galen Barefoot
Attorney, Agent, or Firm—Lyon & Lyon

[57] ABSTRACT

A composite cruciform structure adapted for securely joining two or more intersecting fiber based composite structural members of an airframe and the like, is disclosed. A first bundle of graphite or other fibers of high strength is intimately interwoven with a second bundle of like fibers, with each bundle of fibers extending in a different direction and being aligned with the general longitudinal axis of a respective first and second composite structural member. A third bundle of fibers is interwoven with both the first and second bundles of fibers to form the cruciform structure. The bundles of fibers are reinforced with a suitable cured resin. The cruciform structure may comprise an integral part of the respective structural members, or may be attached thereto by splicing. The cruciform allows for substantially even distribution of structural loads regardless of the direction of the corresponding load force vectors, and is most advantageously utilized in the construction of high strength and low weight airframes.

17 Claims, 7 Drawing Figures

COMPOSITE CRUCIFORM STRUCTURE FOR JOINING INTERSECTING STRUCTURAL MEMBERS OF AN AIRFRAME AND THE LIKE

RELATIONSHIP TO OTHER APPLICATIONS

This application is a continuation of application Ser. No. 475,140, filed Mar. 14, 1983, now abandoned, which is a continuation-in-part of my earlier, copending application, Ser. No. 142,118, filed Apr. 21, 1981, entitled "Composite Structure for Joining Intersecting Structural Members of an Airframe and the Like" now abandoned.

BACKGROUND OF THE INVENTION

1. Field of the Invention

The present invention relates to a structure joining intersecting fiber based composite structural members of an airframe and the like, and to a process for making said structure.

2. Description of the Prior Art

Fiber based composite materials have been known in the prior art for a long time. Briefly, such materials comprise a plurality of relatively thin fibers and a reinforcing cured plastic which substantially covers the fibers and holds them together. Furthermore, it was recognized in the prior art that the structural strength of fiber based composite materials is the greatest in the direction of the fibers. Accordingly, composite materials have been prepared in the past wherein all of the fibers are disposed in one direction parallel to one another. These types of composite materials are hereinafter referred to as unidirectional composite materials.

A principal characteristic of unidirectional fiber based composite materials is their above-mentioned anisotropy. Thus, these materials exhibit relatively great strength to withstand forces which are applied substantially in the direction of the fibers. However, the load bearing or force withstanding capability of the unidirectional fiber based composite materials against forces which are applied perpendicularly to the direction of fibers, is substantially less. This follows from the fact that the parallel disposed fibers of the composite materials are held together only by the cured resin. The prior art composite materials or structures are particularly vulnerable to forces which tend to separate the fibers from one another in a direction perpendicular to the layout of the fibers. Nevertheless, composite materials, and particularly plastic reinforced glass fibers (fiberglass) have found several applications in the prior art where a relatively light weight and yet strong structural material was desired.

The relatively recent development of unidirectional composite materials containing graphite and other fibers of high strength has rendered possible the utilization of fiber based composite materials in airframe construction. More particularly, unidirectional composite materials comprising epoxy resin reinforced graphite or other fibers of high strength are currently used, at least to a limited extent, to provide stringer and frame type structural members in aircraft fuselages, and rib and spar type structural members in aircraft wings.

A substantial disadvantage of conventional type airframe construction is that wherever two structural members intersect one another, it is necessary to provide a cut-away portion in one of the structural members so as to accommodate the other structural member. Cutting away a portion of a structural member, of course, diminishes its load bearing capacity. Consequently, in conventional airframe construction it is necessary to provide additional reinforcing members to fasten the two structural members to one another at their point of intersection.

The principle of prior art airframe construction utilizing the aforementioned reinforcing members is schematically shown on FIGS. 1 and 2 of the drawings. On FIG. 1 a structural member incorporating a cut-away portion illustrates, e.g., a fore-and-aft positioned stringer of an aircraft fuselage, and another structural member illustrates a laterally extending frame member of the fuselage. The necessity of providing a cut-away portion in one of the structural members whenever two structural members "intersect" one another, or "attempt to occupy the same space", is not limited to airframe construction. A similar problem is encountered in the construction of boats, vehicle frames, buildings, etc. It is readily apparent to those skilled in the art that providing appropriately positioned cut-away portions and mounting the necessary reinforcing members or clips is time consuming and significantly contributes to the overall construction cost.

Although the state-of-the-art application of high strength, relatively light weight unidirectional composite materials has offered certain advantages, it has not, up to the present invention, resulted in an altogether different highly advantageous method or structure for joining two intersecting structural members to one another. With particular reference to FIG. 1, it is noted, that in the state-of-the-art airframe and the like composite structures, a cut-away portion is provided in one of the structural members as in conventional metal structures. Attachment of the additional reinforcing members or "clips" may be accomplished, however, by using a structural adhesive resin instead of welding, rivets, screws or bolts and nuts of a conventional metal construction.

Accordingly, there is a substantial need for the novel and unique high strength structure and method of the present invention which provides for a high strength junction of two or more substantially intersecting composite structural members.

SUMMARY OF THE INVENTION

It is an object of the present invention to provide a high strengh interconnection or junction of two or more structural members in an airframe construction and the like wherein each structural member comprises composite material.

It is another object of the present invention to provide a high strength interconnection or junction of two or more composite structural members in an airframe construction and the like wherein the strength of neither structural member is diminished by a cut-away portion.

It is still another object of the present invention to provide a high strength interconnection or junction of two or more composite structural members in an airframe construction and the like which allows for substantially even load bearing and force transmitting capability in a plurality of directions relative to the interconnection.

It is yet another object of the present invention to provide a high strength joining member interconnecting two or more composite structural members in an airframe construction and the like which is readily fastened to and becomes a portion of the joined composite structural members.

These and other objects and advantages are attained by a first bundle of fibers which is interwoven with a second bundle of fibers substantially in a space wherein a first and a second structural member intersect one another. Each bundle comprises a plurality of substantially parallel disposed graphite or like high strength fibers suitable for incorporation in a high strength composite structural material. A third bundle of like fibers is interwoven with each of the first and second bundles in a direction substantially perpendicular thereto, to form the cruciform structure. All the fibers are reinforced with a suitable resin which is applied and thereafter cured to provide a high strength composite wherein the first bundle of fibers extends in the general direction of the first structural member and the second bundle of fibers extends in the general direction of the second structural member. The joining member may be spliced by a suitable structural adhesive resin to the first and second structural members or alternatively may comprise integral parts thereof.

The objects and features of the present invention are set forth in the appended claims. The present invention may be best understood by reference to the following description, taken in connection with the drawings in which like numerals indicate like parts.

DESCRIPTION OF THE PREFERRED EMBODIMENTS

The following specification taken in conjunction with the drawings sets forth the preferred embodiment of the present invention. The embodiments of the invention disclosed herein are the best modes contemplated by the inventor for carrying out his invention in a commercial environment, although it should be understood that various modifications can be accomplished within the parameters of the present invention.

Figure 1:
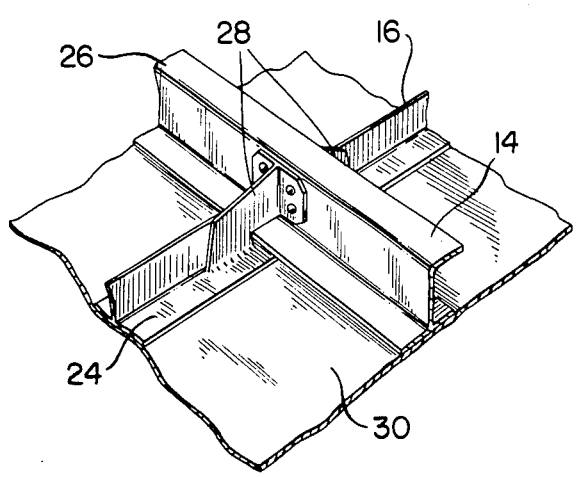
FIG. 1 is a perspective view of a portion of a fuselage of an aircraft wherein a stringer and a frame member are joined into one another in accordance with the prior art.
Figure 2:
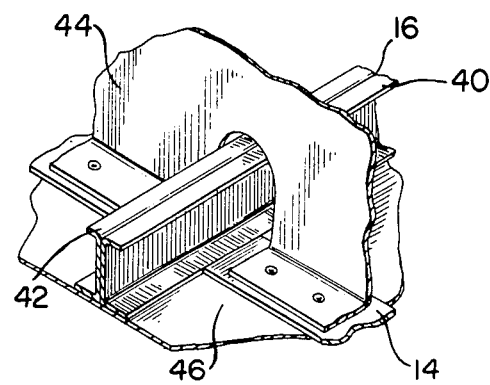
FIG. 2 is a perspective view of a portion of a wing of an aircraft wherein a spar and a rib member are joined to one another in accordance with the prior art.

FIGS. 1 and 2 of the drawings respectively depict aircraft fuselage and wing construction in accordance with the prior art. These figures are explained below in comparison with fuselage and wing construction in accordance with the present invention, shown on the rest of the drawings. The schematic view of FIG. 3 discloses a three dimensional cruciform shaped structure or joining member 12 which comprises a junction of two structural members in accordance with the present invention. Each structural member is made of a fiber based composite material and the manner of joining the fiber based composite structural members to one another comprises a principal novel feature of the present invention.

As it was briefly described in the introductory sections of the present application, a fiber based composite material includes a plurality of relatively thin fibers which are disposed lengthwise, i.e., parallel relative to one another, and a suitable cured resin which substantially covers the fibers and holds them together. The state-of-the-art in the design and manufacture of fiber based composite materials is relatively advanced at the present. Therefore, the following concise, general description of fiber based composite materials and the process of their manufacture is intended solely for the purpose of facilitating the understanding of the present invention and for emphasizing and illuminating the novel features thereof.

Briefly, suitable fibers for the construction of strong composite materials are glass, graphite, carbon, Kevlar and boron fibers. (Kevlar is a trademark of the E. I. duPont Company and is used to designate the source of certain fiber material). The present invention may be practiced with either one of the above-mentioned and with other fiber materials, although the use of glass fibers for the construction of heavy duty aircraft components is generally not preferred. Generally speaking, fibers and particularly graphite fibers used for construction of various structural members have a diameter of approximately 3 mils, and each of said fibers is itself a combination of a plurality of thinner subfibers.

In order to form a structural member of a predetermined dimension a bundle of fibers is positioned in such a manner that the longitudinal axes of the fibers are disposed parallel to one another. A suitable organic resin, which has not yet reached its fully polymerized or fully cured state, is then applied to the fibers. Subsequently, the resin is fully polymerized or cured under exposure to heat and in some instances high pressure. An important factor determining the selection of the proper resin for a given application is the nature of the fibers themselves. A person possessing average skill in the fiber based composite materials manufacturing arts is able to select the proper resin for a fiber of a given composition. Generally speaking, epoxy based resins are utilized in conjunction with graphite and other high strength fibers, although the present invention may be practiced with any type of fiber and resin combination. Usually the final polymerization or curing step of the composite material is conducted at 250°–350° F. for ½–3 hours. The exact parameters of the aforementioned curing step are, of course, dependent on the exact nature of the fibers and on the chemical properties of the resinous binding material. Again, the scope of the present invention is not limited in any way by the physical parameters of the curing step.

Often, the bundle of the parallel disposed fibers is formed in the shape of a relatively thin band or tape, and several of the bands or tapes may be joined together in the curing step to form a structural member. An important characteristic and major advantage of the fiber based composite mat erials, and particularly of graphite fiber based composite materials is that they provide very high strength in the direction of the fibers at a relatively low weight.

The graphite fiber based composite materials are particularly preferred in the present invention for the construction of aircraft structural components, because these materials provide a structural integrity as high or higher than that of steel while the weight of these materials is considerably less than that of steel. On the other hand, a serious disadvantage of fiber based composite materials lies in their anisotropic behavior; in other words these materials exhibit much less structural integrity against forces which are not applied in the direction of fibers. As it is described below, this disadvantage is overcome by the present invention precisely at the points of intersection of two or more composite structural members wherein the disadvantage created by the anisotropy is the least tolerable.

Because of the well established importance of light weight and great structural integrity of materials utilized in airframe construction, the ensuing description is principally directed towards a description of the application of the present invention in airframe construction. Furthermore, the fibers utilized in the practice of the present invention will generally be referred to as graphite fibers. Nevertheless, it should be expressly understood that the scope of the present invention is not limited either to its application in airframe construction nor to the use of graphite fibers only.

Figure 5:
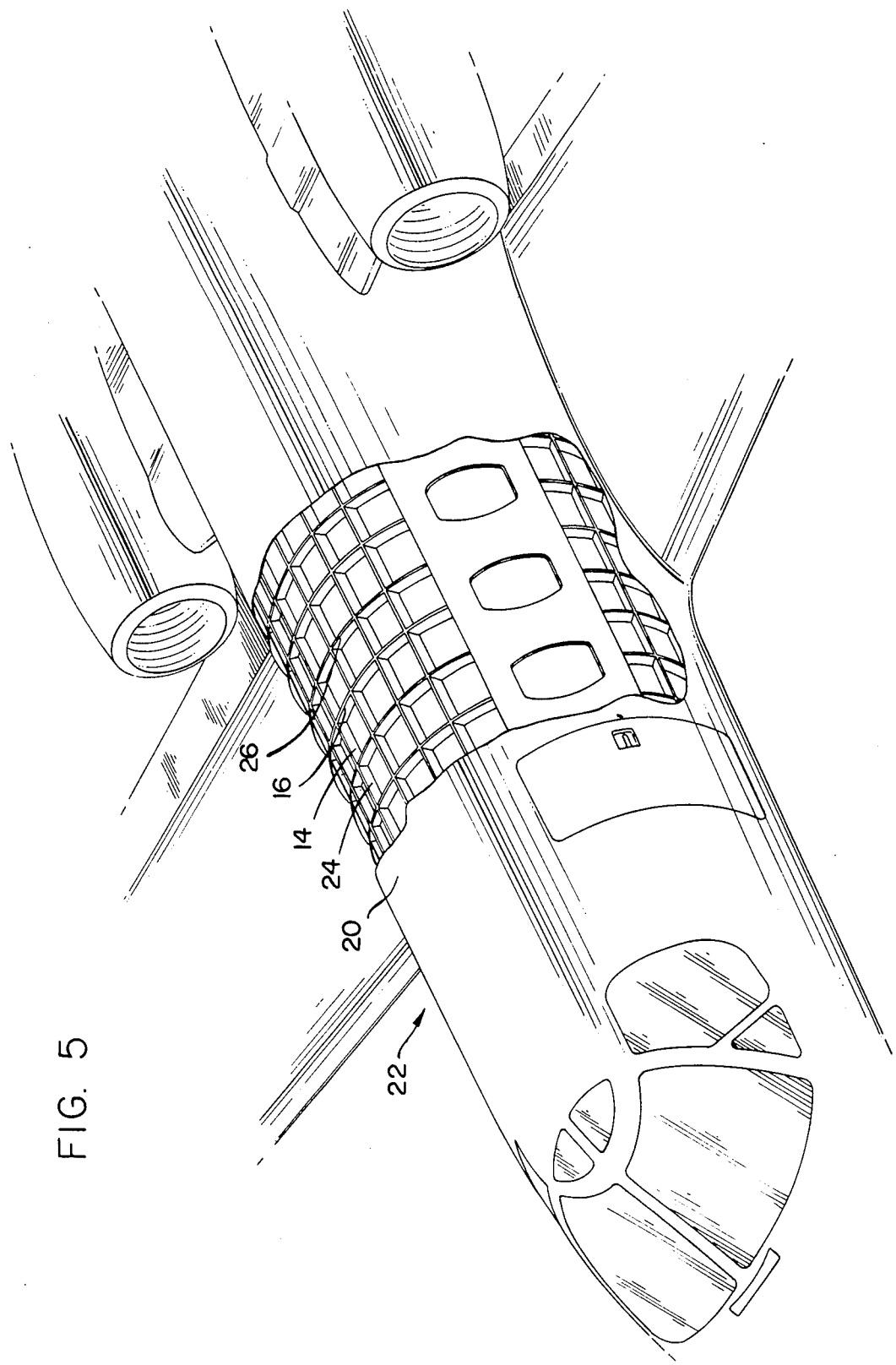
FIG. 5 is a schematic, partial perspective view of an airplane fuselage with part of the skin broken away, the view schematically illustrating frame and string members of the fuselage joined to one another in accordance with the present invention.

Referring again to FIG. 3, the basic principle of the novel structure 12 of the present invention is explained in detail. On FIG. 3 the arrows respectively marked X, Y, and Z indicate three mutually perpendicular axes situated similarly to the axes of a three dimensional coordinate system. In accordance with the present invention, a first substantially elongated structural member 14 is disposed substantially along with X axis, and a second substantially elongated structural member 16 is disposed substantially along the Y axis. Although the first and second structural members 14 and 16 per se are not shown on FIG. 3, a first bundle of fibers 18 corresponding to the first structural member 14 and a second bundle of fibers 19 corresponding to the second structural member 16, are clearly illustrated on this figure. The first structural member 14 may be a stringer in a fuselage 20 of an aircraft 22, and the second structural member 16 may be a frame member in the fuselage 20 of the aircraft 22 as is illustrated in FIG. 5.

A stringer 24 and a frame member 26 of an aircraft fuselage is shown on FIG. 1 which depicts the prior art. It is readily discernible on FIG. 1 that where the stringer 24 and frame members 26 intersect one another, a cut-away portion has been provided in the stringer 24 so as to accommodate the frame member 26. In order not to lose structural strength and to provide for transmission of various forces from the stringer 24 and frame members 26 to one another, a plurality of reinforcing or clip members 28 were provided in the prior art. These were attached to the stringer 24 and to the frame member 26 by welding or by other conventional modes of attachment. Skin attached to the stringer 24 and frame members 26 is indicated by the reference numeral 30 on FIG. 1.

Figure 3:
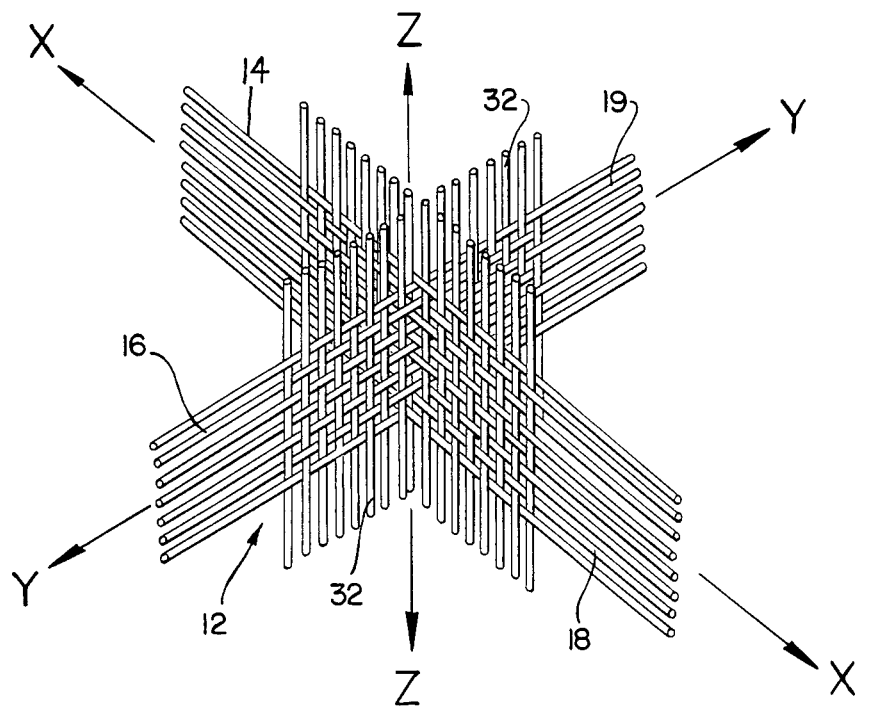
FIG. 3 is a schematic perspective view illustrating the principle of joining two intersecting fiber based unidirectional composite structural members to one another in accordance with the present invention.

In the novel structure shown in FIG. 3, the first bundle of fibers 18, corresponding to the first structural member 14 and hence to frame member 26 of FIG. 1, is interwoven with a second bundle of fibers 19 corresponding to the second structural member 16 (and stringer 24) of FIG. 1. To form the cruciform structure of the present invention, fibers 32 of third or additional bundles are intimately interwoven with fibers of both the first and second bundles 18 and 19. The fibers of bundle 32 are disposed in the direction of the z-axis and thus are substantially perpendicular to the general longitudinal axes of the fibers of bundles 18 and 19. It will thus be appreciated that the interwoven bundles of fibers are in the form of a sheet or layer of woven fibers laying in the x and z axes and an intersecting sheet or layer of woven fibers laying in the y and z axes, thereby forming the desired cruciform structure.

In a preferred embodiment of the present invention, interweaving of the fibers is accomplished in such a manner that each fiber of bundle 18 running in the direction of the x-axis is positioned between two fibers of bundle 32 extending in the direction of the z-axis. This is also true with regard to the fibers of bundle 19, that is, each fiber of bundle 19 is likewise positioned between two fibers of bundle 32.

Although FIG. 3 shows bundles 18 and 19 perpendicularly disposed to one another, it is important to understand that the present invention is not limited in this manner. In other embodiments (not shown), bundles 18 and 19 may be disposed at other than 90% angles relative to one another.

After having interwoven the fibers of the three bundles 18, 19, and 32, a suitable prepolymerized resin (not shown) is applied to the structure 12. Subsequently the resin is cured by heat according to standard practice in the art. In this regard, it is noted that for the sake of clear illustration of the spatial arrangement of the fibers, the resin applied to the fibers has been omitted from the drawing figures. Furthermore, it is emphasized that the drawing figures and particularly FIGS. 3 and 4 are merely schematic, and the actual number of fibers in each of the bundles 18, 19 and 32 is very large, as is in fiber based composite structural members of the prior art.

Figure 4:
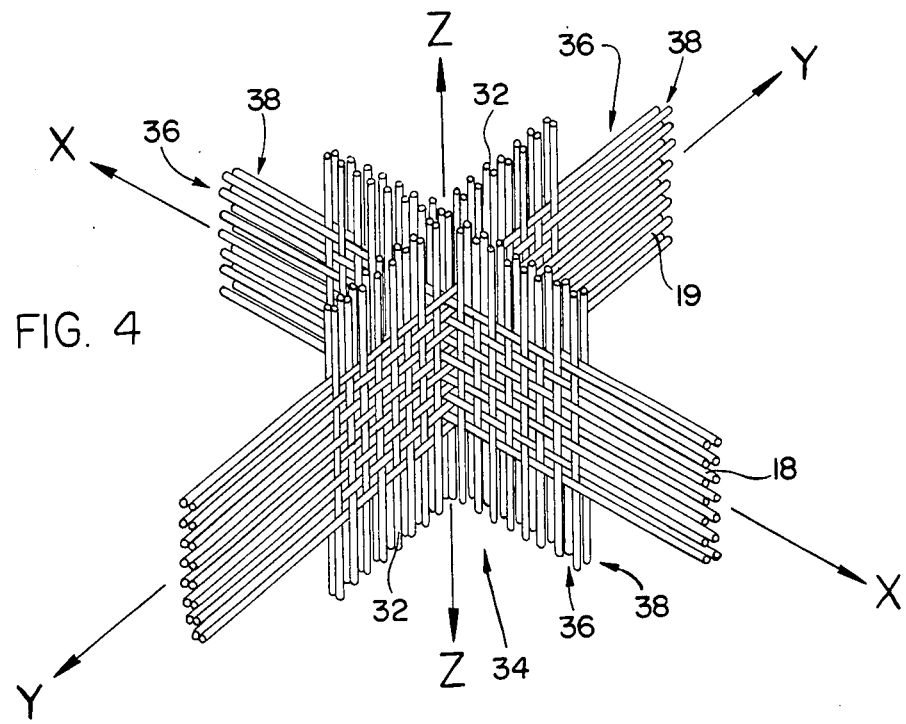
FIG. 4 is a schematic, perspective view further illustrating the principle of joining two intersecting fiber based unidirectional composite structural members to one another in accordance with the present invention.

FIG. 4 represents a schematic view of an embodiment of the cruciform shaped structure 34 of the present invention wherein each bundle of fibers 18, 19 and 32 comprises two layers of fibers. A first and a second layer of fibers in the bundle are provided for the sake of illustration with the respective reference numerals 36 and 38. The layers of the fibers of the several bundles are interwoven with one another in a manner similar to the interweaving of the single layers of fibers as is shown on FIG. 3. Each bundle 18, 19 and 32 is respectively disposed substantially in the direction of the respective X, Y and Z axes, although it should be again understood that the novel structure of the present invention may also be constructed in such a manner that the respective bundles of fibers and hence the respective structural member 14 and 16 are not at a 90% angle relative to one another.

In the actual practice of the present invention it is often necessary to provide multiple layers of fibers in each bundle in order to obtain a junction of the structural members which is sufficiently strong for incorporation in an aircraft. Each layer of fiber is relatively thin as compared to its length and width. Therefore, the layers are referrred to as two dimensional layers. Actual dimensions of the structural members are determined by the particular engineering requirements of the aircraft frame other structure. In certain embodiments, one structural member may comprise a substantially lesser number of layers of fibers than a second structural member which is interwoven therewith.

Referring now to FIG. 2 which schematically depicts a wing construction 40 in accordance with the prior art, it is noted that the first and second structural members 14 and 16 of FIGS. 3 and 4 may also correspond respectively to a wing spar member 42 and to a wing rib member 44. Skin 46 of the wing 40 may be attached to the novel composite wing structure by conventional means or by the use of a structural adhesive plastic. The use of structural adhesive plastic is well established in the art and need not be described here in detail.

Figure 6:
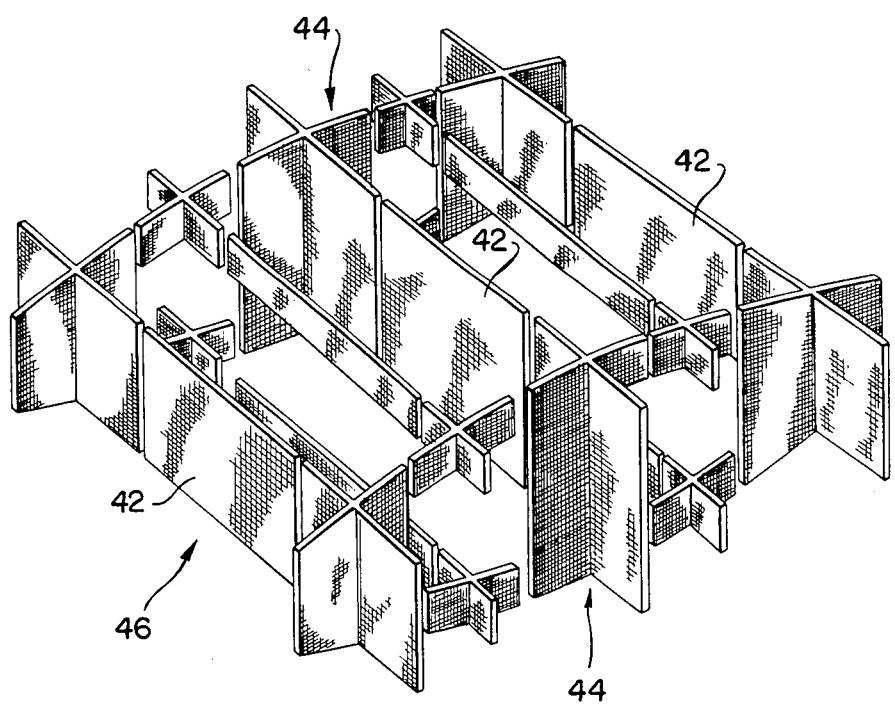
FIG. 6 is a schematic view of a wing of an airplane with part of the skin of the wing broken away, the view schematically illustrating structural members of the wing joined to one another in accordance with the present invention.

Referring now to FIGS. 5 and 6, an aircraft fuselage 20 and a wing 46 are schematically shown wherein intersecting frame 26 and stringer 24 members and intersecting wing spar 42 and rib memebers 44 are respectively constructed in accordance with the present invention. The schematic drawing of FIGS. 5 and 6 reveal that due to the novel mode of construction, no cut-away portion is provided where these members intersect each other. This is, of course, in sharp contrast with the prior art fuselage and wing constructions which are illustrated in FIGS. 1 and 2.

It is an additional aspect and additional advantage of the present invention that the cruciform shaped structures exemplified in FIGS. 3 and 4 as 12 and 34 may be provided in a preformed shape prior to assembling into an airframe or like structure. It is standard practice in the art to manufacture fiber based composite materials in the shape of a woven fabric which already contains the binding organic resin in a suitable prepolymerized form. These materials are routinely referred to in the art as pre-impregnated or "prepreg" materials. Because final curing of the binding resin does not occur unless the resin is subjected to heat, the pre-impregnated composite materials usually maintain their uncured state for a prolonged period of time particularly if they are kept at lower than ambient temperature.

Figure 7:
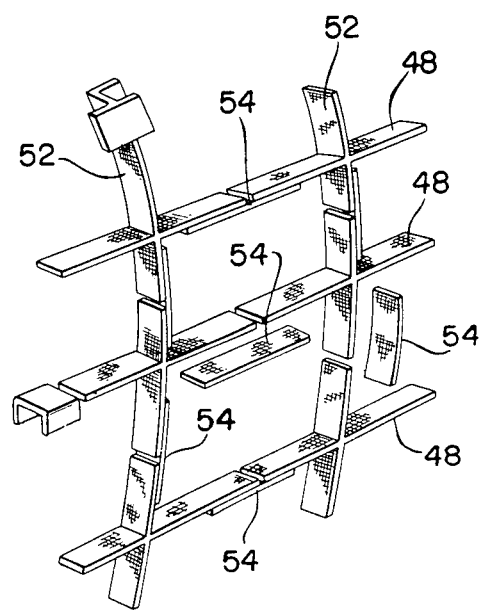
FIG. 7 is a schematic perspective view showing six composite cruciform structural members being spliced to one another, each composite structural member including a substantially cruciform shaped junction with another structural member, said junctions formed in accordance with the present invention.

Thus, it is possible, in accordance with the present invention to manufacture several portions of an airframe and the like from composite materials in a preimpregnated state. As an example, FIG. 7 schematically illustrates three portions 48 of a stringer 24 of a fuselage 20, with each portion 48 already having two respective portions 52 of a frame member 26 attached thereto, by the above described interwoven composite structure. Each of these portions of the string 24 and of the frame 26 are in a preimpregnated stated. They are spliced to one another during the assembly of the airframe by the use of structural adhesive plastic (not shown) and by conventional splice plates 43 schematically illustrated FIG. 7. Subsequent to splicing, the entire airframe or a suitably selected part thereof is finally cured in an autoclave or oven (not shown). In this final curing step, requisite curing of the structural adhesive resin may also occur.

What has been described above is a novel structure for strongly joining intersecting structural members made of fiber based composite materials. The novel structure is capable of overcoming prior art constraints of load absorbing continuity. Various modifications of the present invention may become readily apparent to those skilled in the art. Consequently, the scope of the present invention should be interpreted solely from the following claims.

What is claimed is:

1. An aircraft structure comprising non-intersecting structural elements and intersecting structural elements, the intersecting structural elements being of a composite cruciform structure having intersecting structural members, and the non-intersecting structural elements being elongated planar elements extending between and overlapping adjacent structural members of adjacent intersecting structural elements of the cruciform structure, said cruciform structure comprising a first bundle of fibers interwoven with a second bundle of fibers and additional fibers interwoven with each of said first and second bundles of fibers in a direction substantially perpendicular to the fibers of said first and second bundles, to form said cruciform structure, said fibers having a reinforcing resin on the surface thereof to provide a strong substantially rigid structure joinder of said structural members without a substantial break in the continuity of the fibers and to provide substantially even load bearing and force transmitting capability in a plurality of directions with respect to said intersection of sid structural members.

2. The structure of claim 1 wherein each bundle of fibers comprises a plurality of layers of fibers.

3. The structure of claim 1 wherein the fibers are selected from the group consisting of carbon, graphite, Kelvar, glass and boron fibers.

4. The structure of claim 3 wherein each fiber is approximately 0.001 inch in diameter, and each of said fibers comprises a plurality of thinner subfibers.

5. The structure of claim 1 in which said first and second bundles of fibers are substantially perpendicular to one another.

6. The structure of claim 1 wherein first non-intersecting structural elements and first intersecting structural members comprise a stringer member in a fuselage of an aircraft and second non-intersecting structural elements and second intersecting structural members comprise a frame member in the fuselage of the aircraft.

7. The structure of claim 6 wherein the first and second bundles of fibers are respectively spliced to fibers comprising the first and second non-intersecting structural elements of the respective stringer and frame members.

8. The structure of claim 1 wherein first non-intersecting structural elements and first intersecting structural members comprise a rib member of a wing or empennage of the aircraft and wherein second non-intersecting structural elements and second intersecting structural members comprise a spar member of the wing or empennage of the aircraft.

9. The structure of claim 1 wherein each bundle of fibers comprises a plurality of substantially two-dimensional layers of fibers, said layers in each bundle being disposed substantially parallel to one another.

10. The structure of claim 1 in which fibers of said first and second bundles are interwoven between two of said additional substantially perpendicular fibers.

11. a structure as claimed in claim 1 wherein the additional fibers are parallel to the axial direction through the intersection of the intersecting structural members of the cruciform structure.

12. An aircraft structure comprising non-intersecting structural elements and intersecting structural elements, the intersecting structural elements being of a composite cruciform structure having intersectng structural members, the non-intersecting structural elements being elongated planar elements extending between and overlapping adjacent structural members of adjacent intersecting structural elements of the cruciform structure, said cruciform structure comprising a first bundle of fibers interwoven with a second bundle of fibers, and additional bundles of fibers disposed substantially perpendicular to said first and second bundles of fibers and interwoven with both said first and second bundles to form said cruciform structure, said fibers being selected from the group consisting of carbon, graphite, Kevlar, glass and boron fibers, each of said bundles of fibers comprising a plurality of layers of fibers, said bundles being provided with a reinforcing resin on the surface thereof, to provide a strong substantially rigid structural joinder of said structural members without a substantial break in the continuity of said fibers and to provide substantial even load bearing and force transmitting capability in a plurality of directions with respect to said intersecting of said structural members.

13. The structure of claim 12 in which said first and second bundles of fibers are substantially perpendicular to one another.

14. A process for forming structures comprising non-intersecting structural elements and intersecting structural elements by strongly and substantially rigidly joining first substantially elongated composite structural members and second substantially elongated composite structural members which form the intersecting structural elements, said first and second structural members extending in different directions relative to one another, the process comprising the steps of:

interweaving a first bundle of fibers comprising a portion of the first structural member with a second bundle of fibers comprising a portion of the second structural member, said first and second bundles of fibers substantially extending in the same direction as the respective elongated structural members;

interweaving additional fibers with said first and second bundles disposed substantially perpendicular relative to said first and second bundles of fibers;

applying a suitable reinforcing resin to said fibers including the area wherein the bundles are interwoven;

curing said resin; and attaching the structural members to the non-intersecting structural elements, the non-intersecting structural elements being elongated planar elements extending between and overlapping adjacent structural members of adjacent intersecting structural elements.

15. The process of claim 14 wherein the fibers are selected from the group consisting of carbon, graphite, glass, Kevlar and boron fibers.

16. The process of claim 14 further comprising the step of splicing at least one of the first and second bundles of fibers to the non-intersecting structural members.

17. The process of claim 16 wherein the step of splicing includes applying an adhesive resin to at least one of the respective bundles of fibers and of the corresponding non-intersecting structural member, and curing said adhesive resin.

* * * * *